Patented Jan. 6, 1931

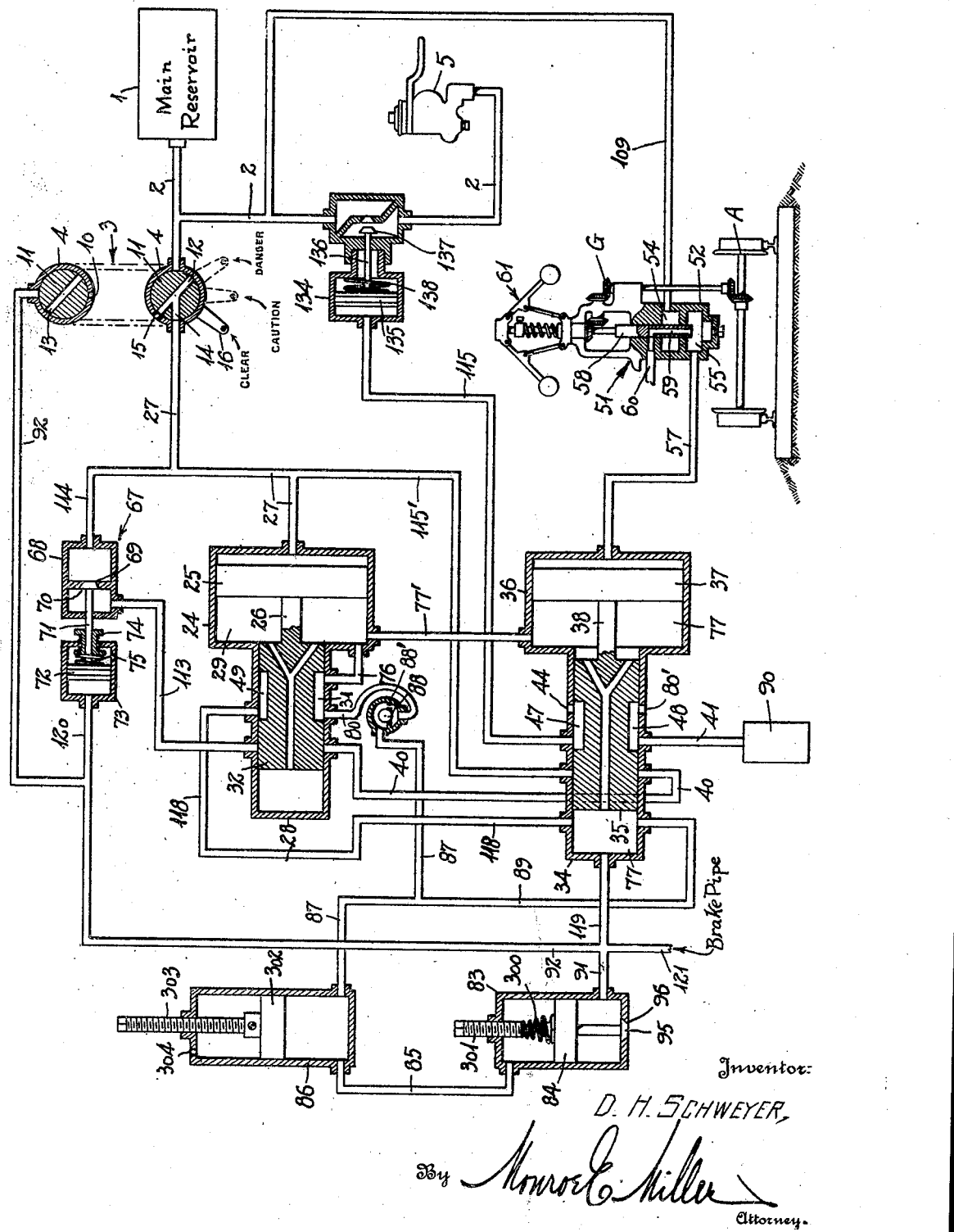

1,787,554

UNITED STATES PATENT OFFICE

DANIEL HERBERT SCHWEYER, OF EASTON, PENNSYLVANIA

AIR-BRAKE APPARATUS

Application filed December 26, 1924. Serial No. 758,206.

The present invention relates to train control systems, and more particularly to air brake apparatus for automatically controlling the air brake system of a train to effect applications of the brakes thereon, and the primary object of this invention is the provision in such an apparatus of means whereby the extent or amount of reduction of pressure in the brake pipe of the system is regulated and controlled when an automatic application is effected under certain conditions.

This invention is in line with the apparatus disclosed in my Patent No. 1,389,602, granted Sept. 6, 1921, although the invention can be used with other similar apparatus for which it is suited. In such apparatus, under caution or service brake application conditions, the extent or amount of reduction of pressure in the brake pipe is limited, and in the present apparatus the amount or extent of reduction of brake pipe pressure may be adjusted or regulated.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a diagrammatical view of the apparatus, portions being shown in section and portions in elevation.

The present apparatus, in construction and operation, is substantially the same as that disclosed in the aforesaid patent, corresponding reference characters being used in the drawings, and such devices and parts of the apparatus shown in said patent which are not material to an understanding of the present invention, have been omitted herein, and the showing has also been simplified in other respects.

The present air brake equipment or apparatus uses the main reservoir 1 of the air brake system of the train or vehicle, from which reservoir the air supply pipe 2 leads to the engineer's brake valve 5 which, as well known, is operated for supplying air from the main reservoir into the brake pipe, or for bleeding the air from the brake pipe to atmosphere, for releasing and applying the brakes, respectively. The connection between the brake valve 5 and the brake pipe is not shown, but same is well understood in the art.

A main control valve 3 is provided which provides for, in its different positions, clear, caution, and danger conditions. A caution condition, for purposes of the present invention, is synonymous with a service brake application, and a danger condition is, for purposes of the present invention, synonymous with an emergency brake application.

The control valve 3 is a duplex valve, and comprises a cylindrical casing 4 in which a turn plug 11 is rotatable, and the pipe 2 and pipes 27 and 92 are connected to said casing. The plug 11 has an arm or lever 16 for turning the plug to clear, caution or service and danger or emergency positions, and said arm may be operated by any suitable mechanism, such for example, as shown in the aforesaid patent, the manner of or means for controlling the valve 3 forming no part of the present invention. When the plug 11 is in clear position a passage 12 therein registers with a port 15 opening into the atmosphere and a branch passage 14 of the passage 12 registers with the pipe 27 thereby connecting said pipe with the atmosphere. When the plug 11 is turned to caution or service position the passage 12 establishes communication between the pipes 2 and 27, and when the plug 11 is turned further to danger or emergency position the passage 13 of the plug 11 connects the pipe 92 with a port 10 opening into the atmosphere for bleeding the brake pipe, as will hereinafter more fully appear.

A caution or service valve device is provided to change connections between some of the pipes or passages under caution conditions. This device includes a cylinder 24 having a valve casing 28 connected thereto, and a piston 25 works in said cylinder and has a stem 26 connected to a valve 32 slidable in the casing 28. The pipe 27 is connected to the outer end of the cylinder 24, so that the air is discharged from said cylinder through the pipe 27, passages 14 and 12 and port 15 when the valve 3 is in clear position. The air in the chamber 29 of the cylinder 24 and casing 28 will therefore move the piston 25 toward the right, so that the valve 32 closes the pipes 40, 113 and 118 connected to the casing 28. In this position of the valve 32 a cavity 31 thereof establishes communication between pipes or passages 76 and 80, the pipe or passage 76 communicating with the chamber 29. When the valve 3 is in caution position so that air flows from the pipe 2 through the passage 12 and pipe 27 into the cylinder 24, the piston 25 and valve 32 are moved toward the left, so that a cavity 49 in the valve 32 establishes communication between the pipes 113 and 118, and, in this position of said valve, the cavity 31 connects the pipes 40 and 80, the passage or pipe 76 being closed.

It will therefore be apparent that the position of the caution valve 32 will depend upon the position of the control valve 3, the valve 32 being at the right or normal position when the valve 3 is in clear position, and the valve 32 being at the left or caution position when the valve 3 is in caution position.

Complementing and cooperable with the caution valve device is a speed controlled valve device of similar construction, and comprising a cylinder 36 having a valve casing 34 united therewith. A piston or diaphragm 37 works in the cylinder 36 and has a stem 38 to which a valve 35 is connected, said valve sliding in the casing 34. The position of the piston 37 and valve 35 is controlled by the speed of the train or vehicle, as will hereinafter more fully appear. The pipes 40 and 118 which are connected to the casing 28 are also connected to the casing 34, as well as pipes 41, 89, 115, 115' and 119. The pipe 119 is always in communication with the chamber 77 of the cylinder 36 and casing 34, and the casing 34 has ports 44 and 80' opening into the atmosphere. When the valve 35 is in its right or low speed position it closes the pipes 40 and 115', and the pipes 89 and 118 are in communication with one another and with the chamber 77 and pipe 119. In this position of the valve 35, cavities 47 and 48 of said valve connect the pipes 115 and 41 with the ports 44 and 80', respectively. When the valve 35 is moved to the left or high speed position, the pipes 89 and 118 and ports 44 and 80' are closed, and the cavities 47 and 48 now connect the pipes 115 and 115' and the pipes 40 and 41, respectively.

A governor operated valve 51 is provided to control the speed controlled valve device, and includes a casing 52 having the chambers 54 and 55 and an exhaust port 60 leading to the atmosphere. The pipe 109 connects the chamber 54 and the air supply pipe 2, and a pipe 57 connects the chamber 55 and the outer end of the cylinder 36. A valve member 58 is slidable in the casing 52 and is operated by a centrifugal governor 61 which is geared, as at G, in any suitable manner with an axle A or other part of the train or vehicle which moves in proportion to the speed of the train, whereby the valve member 58 is positioned according to the speed of the train. The valve member 58 has a passage 59 that is always in communication with the chamber 55, and which communicates with the port 60 when the valve member 58 is raised and which communicates with the chamber 54 when the valve member is moved downwardly. Said valve member is controlled by the governor so as to be raised when the train is travelling below a predetermined maximum caution or service speed, of say twenty to thirty miles per hour, depending on the adjustment of the governor. When such speed is exceeded the valve member 58 is moved downwardly to disconnect the chamber 55 and port 60 and to then connect the chambers 54 and 55. Consequently, under "low" speed, that is, below the aforesaid predetermined speed, the valve member 58 is raised and air in the cylinder 36 can escape through the pipe 57, chamber 55, passage 59 and port 60 to the atmosphere, so that the piston 37 and valve 35 will move to the right or low speed position. Under "high" speed, that is, with the train travelling above the aforesaid speed, the valve member 58 is moved to disconnect the port 60 from the chamber 55, so that the passage 59 now connects the chambers 54 and 55. The air from the main reservoir then flows through the pipe 2, pipe 109, chamber 54, passage 59, chamber 55 and pipe 57 into the cylinder 36, thereby moving the piston 37 and valve 35 to the left or high speed position.

A recharging valve device is provided for controlling the recharging of the brake pipe under certain conditions, as will hereinafter more fully appear. This valve device 67 includes a valve casing 68 having a valve seat 69 therein for a valve member 70 carried by a stem 71 connected to a piston 72 working in a cylinder 73. A tubular adjusting screw 74 is threaded through one end of the cylinder 73 and the stem 71 slides through said screw. A coiled wire expansion spring 75 is confined between the adjusting screw 74 and piston 72 to urge the valve member 70 to open position when the pressure of air against the piston 72 falls below a predetermined amount. The pipe 113 is connected to the casing 68 and a pipe 114 connects the pipe 27 with said casing 68, and when the air pressure against the piston 72 overcomes the spring 75 the valve member 70 is closed, thereby shutting off communication between the pipes 113 and 114. A pipe 120 connects the pipe 92 and cylinder 73 whereby the piston 72 is subjected to brake pipe pressure which is normally sufficient to move the piston 72 and close the valve member 70. The pressure at which the spring 75 moves the piston 72 to open the valve member 70 depends on the adjustment of the screw 74 which may be changed as desired or necessary.

A differential or equalizing valve device is provided for controlling the extent or amount of reduction of pressure in the brake pipe under caution or service conditions, or for other appropriate conditions. This device includes a cylinder or chamber 83 in which a piston or diaphragm 84 is movable, and the cylinder 83 is connected above the piston by a pipe 85 with an auxiliary reservoir or chamber 86 which is in turn connected by a pipe 87 with the pipe or passage 80, a check valve 88 being disposed between the pipes 80 and 87 and opening in a direction toward the reservoir 86, and the valve has a small hole 88' permitting a slow restricted flow of air from the reservoir 86 to the pipe 80, but the flow reversely toward the reservoir is unrestricted by the valve. The pipe 89 is connected to the pipe 87. A pipe 91 is connected to the cylinder or chamber 83 below the piston 84, and the pipes 91, 92 and 119 and all connected to the brake or train pipe 121. The cylinder or chamber 83 has an exhaust port 96 opening into the atmosphere and normally closed by a valve member 95 carried by the piston 84, the pipe 91 communicating with the chamber between the piston 84 and port 96, so that when the piston 84 is raised air can bleed from the brake pipe into the atmosphere by way of the pipe 91 and port 96. The piston 84 is normally subjected to brake pipe pressure from above, so that the downward pressure on the piston 84, in addition to the gravitation of the piston and valve, will result in the valve member 95 being normally closed. However, when the pressure in the cylinder 83 above the piston 84 is reduced the brake pipe pressure in said cylinder under the piston 84 will raise the piston and valve member 95 so that the air can escape from the brake pipe to the atmosphere. The piston 84 and valve member 95 are therefore moved in accordance with differences in pressures above and below the piston, with a "differential" or equalizing action.

An expansion reservoir or chamber 90 is connected to the pipe or passage 41 for receiving air from the auxiliary reservoir 86 under certain conditions, in order to provide for a limited reduction in pressure in the brake pipe, as will hereinafter more fully appear.

A cut off valve device is provided for the engineer's brake valve 5, including a cylinder 134 to which the pipe 115 is connected and in which the piston 135 works. The piston has a stem 136 controlling a valve 137, and said valve is normally opened by a spring 138 urging the piston 135 toward the pipe 115, so that air from the main reservoir can flow to the brake valve 5, permitting the engineer to supply air to the brake pipe. However, when the air flows into the cylinder 134 from the pipe 115 to close the valve 137, by moving the piston 135 against the force of the spring 138, air is cut off from the engineer's brake valve 5, so that the engineer is prevented from supplying air, under the caution conditions, into the brake pipe for releasing the brakes. This takes away from the engineer the releasing of the brakes when the valve 137 is closed.

The apparatus as described up to this point is substantially the same as the apparatus disclosed in the aforesaid patent, and the operation is also substantially the same, and devices and parts not pertinent to a consideration of the present invention have been eliminated herein for purpose of simplicity.

The operation of the apparatus is as follows:

Under clear or unrestricted conditions, the valve 3 is in clear position, so that air in the cylinder 24 escapes to the atmosphere by way of the pipe 27, passages 14 and 12 and port 15. Under these conditions the valve 137 is opened by the spring 138, and the engineer can therefore charge the brake pipe through the brake valve 5 as usual. Regardless of whether the valve 137 is open or closed the brake valve 5 can always be operated for discharging air from the brake pipe for applying the brakes. Air flows from the brake pipe 121 into the pipe 119, chamber 77, pipe 89, pipe 87, reservoir 86, pipe 85 and cylinder 83 above the piston 84, and also flows from the pipe 87 past the valve 88 into the pipe 80, cavity 31 and pipe or passage 76 into the chamber 29, so that the brake pipe pressure moves the piston 25 toward the right, the air from the opposite side of the piston being forced out to the atmosphere. The chambers 77 and 29 are also connected by a pipe or passage 77' so that they are both normally under brake pipe pressure. If the valve 32 is at the left, with the pipe 76 closed, air can flow from the chamber 77 through the pipe or passage 77' into the chamber 29 to move the piston 25 and valve 32 toward the right. Should the piston 37 and valve 35 be at the left or high speed position, to close the pipe 89, then air from the brake pipe 121 can flow by way of the pipe 119, chamber 77 and passage or pipe 77' into the chamber 29, and when the piston 25 and valve 32 are at the right, air can then flow from the chamber 29 through the pipe 76, cavity 31, pipes 80 and 87 into the auxiliary reservoir 86, the check valve 88 opening for the unrestricted flow of air from the pipe 80 into the pipe 87. Air from the brake pipe also flows through the pipes 92 and 120 into the cylinder 73 to move the piston 72 for closing the valve member 70. The pressure above the piston 84 being greater than the pressure below the piston will result in the valve 95 being closed.

While running under these conditions the valve 35 may be in either low speed or high speed position, depending upon the speed of travel of the train, but this does not affect the apparatus excepting under caution or service conditions.

Under caution or service brake application conditions the valve 3 is in caution or service position with the passage 12 establishing communication between the pipes 2 and 27, so that air flows from the main reservoir into the cylinder 24 and the main reservoir pressure acting against the piston 25 overcomes the brake pipe pressure from the opposite side of the piston, thereby moving the piston 25 and valve 32 toward the left, so that the cavities 31 and 49 connect the pipes 40 and 80 and the pipes 113 and 118, respectively. If the train is travelling at low speed, as hereinbefore mentioned, with the valve member 58 raised so that air from the cylinder 36 discharges to the atmosphere by way of the pipe 57, chamber 55, passage 59 and port 60, the valve 35 is at the right for low speed position, and nothing happens to effect the application of the brakes. However, should the speed of the train exceed the maximum predetermined speed for caution or service conditions, the valve member 58 being moved downwardly so that the passage 59 connects the chambers 54 and 55, will permit air to flow from the main reservoir through the pipes 2 and 109, chamber 54, passage 59, chamber 55 and pipe 57 into the cylinder 36, whereby the main reservoir pressure acting against the piston 37 will overcome the brake pipe pressure at the opposite side of the piston, to move the valve 35 to the left or high speed position. Air will then flow immediately from the pipe 27 through the pipe 115′, cavity 47, and pipe 115 into the cylinder 134 to move the piston 135 and close the valve 137, thereby taking away main reservoir pressure from the brake valve 5, so that the brakes cannot be released by the engineer under these conditions. Furthermore, communication between the auxiliary reservoir 86 and expansion reservoir 90 is established by way of the pipe 87, hole or port 88′ of check valve 88, pipe 80, cavity 31, pipe 40, cavity 48, and pipe 41. The air flowing slowly from the reservoir 86 to the reservoir 90 (retarded by the hole 88′ of valve 88) will result in a predetermined reduction in pressure in the cylinder 83 above the piston 84, depending on the relative sizes or capacities of the reservoirs 86 and 90, and the brake pipe pressure underneath the piston 84 will therefore overcome the reduced pressure above the piston, to raise said piston and open the valve 95. Air will therefore bleed to the atmosphere from the brake pipe 121 by way of the pipe 91 and port 96, thereby applying the brakes gradually, with a service application. As soon as the brake pipe pressure has been reduced a predetermined amount, depending upon the amount of reduction in the reservoir 86 and upper portion of the cylinder 83, the pressures in the cylinder or chamber 83 above and below the piston 84 are equalized or balanced, and the piston 84 is then moved downwardly to seat the valve member 95 over the port 96. This arrests or stops the further bleeding of air from the brake pipe to the atmosphere. The partial application of the brakes, resulting from the limited reduction in brake pipe pressure, will retard the train, and when the speed has been reduced below the predetermined maximum caution or service speed, the valve member 58 is again raised so that air from the cylinder 36 escapes to the atmosphere, whereby brake pipe pressure in the chamber 77 will move the piston 37 and valve 35 to the right or low speed position. Air in the reservoir 90 discharges to the atmosphere by way of the pipe 41, cavity 48 and port 80′, and air discharges from the cylinder 134 by way of the pipe 115, cavity 47 and port 44, so that the valve 137 is again opened.

If there has been a sufficient reduction in brake pipe pressure so that the spring 75 asserts itself to move the piston 72 and open the valve member 70, the brake pipe 121 and reservoir 86 will be recharged by air flowing from the pipe 2 through the passage 12 of the valve 3, pipe 27, pipe 114, valve casing 68, pipe 113, cavity 49 with valve 32 in left or caution position, pipe 118, chamber 77 and pipe 119 to brake pipe 121, and also from chamber 77 through pipes 89 and 87 into the auxiliary reservoir 86. As soon as the pressure is increased sufficiently so that the brake pipe pressure against the piston 72 closes the valve 70, the flow of air from the pipe 2 to the brake pipe 121 and reservoir 86 is stopped by the closing of the valve member 70.

Should the allotted speed again be exceeded, the valve 35 being moved to the left or high speed position, with the valve 32 in left or caution position, will result in the brake pipe pressure again being reduced owing to the flow of air from the reservoir 86 into the reservoir 90, as hereinbefore explained, this reduction in brake pipe pressure being accomplished whenever exceeding the speed limit under caution or service conditions.

Under danger or emergency conditions, with the valve 3 in danger or emergency position, the passage 13 opens the pipe 92 to the atmosphere so that air bleeds from the brake pipe 121 through the pipe 92, passage 13 and port 10 into the atmosphere, thereby providing an emergency application of the brakes. This provides an application of the brakes the same as when the brake valve 5 is operated to open the brake pipe to the atmosphere.

The valve 3 thus provides an emergency brake valve so far as the passage 13 thereof is concerned, while the valve 95 provides a brake valve for caution or service conditions, for discharging air from the brake pipe to the atmosphere.

The operation as hereinbefore described is substantially the same as the operation of the apparatus disclosed in the aforesaid patent, and the means or provisions will now be described by virtue of which the extent or amount of reduction of brake pipe pressure is regulated or adjusted. Thus, a coil spring 300 is confined between the piston 84 and an adjusting screw 301 threaded through the upper end of the cylinder 83, so that said spring urges the piston 84 and valve 95 downwardly with a force depending on the adjustment of the screw 301. Accordingly, the spring 300 assists air pressure above the piston in moving the piston downwardly and closing the valve 95 against brake pipe pressure underneath the piston, under clear conditions. When the reservoirs 86 and 90 are connected under caution or service conditions, as aforesaid, so that air flows from the reservoir 86 into the reservoir 90, the reduction in pressure above the piston 84 will enable the piston 84 to be raised by brake pipe pressure from underneath when the brake pipe pressure below the piston overcomes the reduced pressure above the piston and pressure of the spring 300, permitting the air to escape from the brake pipe to the atmosphere until the brake pipe pressure has been so reduced, according to the adjustment of the spring 300, that the brake pipe pressure is slightly less than the pressure above the piston 84 combined with the pressure of the spring 300. The valve 95 is then closed, and it will be apparent that the particular reduced brake pipe pressure at which the valve 95 closes depends upon the adjustment of the screw 301 or equivalent means.

Also, to adjust or regulate the amount of reduction in brake pipe pressure under caution conditions, the capacity of the reservoir 86 is made adjustable by means of a piston 302 working in said reservoir, which may be adjusted by means of an adjusting screw 303 screw-threaded through one end of said reservoir. The reservoir has a port 304 at that side of the piston or partition 302 opposite to the pipes 85 and 87, to permit the piston to be adjusted. It is apparent that when the storage chamber of the reservoir 86 is increased in size or volume, as compared with the reservoir 90, there will not be so great a reduction in pressure in the reservoir 86 and cylinder 83 above the piston 84 as when the capacity of the reservoir 86 is smaller with reference to the reservoir 90. In other words, the greater the amount of air that can be stored in the reservoir 86, with reference to the reservoir 90, the less will be the reduction in pressure above the piston 84 when the reservoirs 86 and 90 are connected as hereinbefore described. Consequently, by adjusting the piston 302, it is possible to regulate the amount of reduction in pressure above the piston 84, which will correspondingly regulate the amount of reduction of brake pipe pressure under caution conditions. The spring 300 and piston 302 may both be adjusted for regulating the amount of brake pipe pressure reduction, or either the spring or piston may be adjusted.

The spring 300 and adjusting screw 301 correspond to the spring 75 and adjusting screw 74 of the piston 72, excepting that the spring 300 is used to close the valve 95 while the spring 75 opens the valve member 70.

As hereinbefore mentioned the relative sizes or capacities of the reservoirs 86 and 90 control the amount of reduction in brake pipe pressure, so that by adjusting the relative capacities of the reservoirs it is a simple matter to adjust or regulate the amount of brake pipe pressure reduction.

The gist of the present invention, therefore, as compared with the apparatus disclosed in the aforesaid patent, or similar apparatus, lies in the use of the adjustable spring means 300—301, or the adjustable piston 302, or both, whereby the amount of brake pipe pressure reduction under caution or similar conditions may be regulated and adjusted conveniently. Various adjustable spring means for the piston 84 can be used and it is also possible to use various means for increasing and decreasing the capacity of one of the reservoirs 86 and 90.

The air chamber of the reservoir 86 is in fact a continuation of the air chamber in the casing 83 above the piston 84, so that the reservoir 86 may be combined either directly or indirectly with the casing 83. Thus, the air space of the casing 83 above the piston 84 can be rendered adjustable by a separate reservoir 86, or by any other suitable means.

Having thus described the invention, what is claimed as new is:—

1. A train brake control apparatus comprising a valve controlling an exhaust port, a fluid operated device for operating the said valve, a port for admitting fluid at brake pipe pressure to one side of said device, a second valve for controlling the admission of fluid at brake pipe pressure to the opposite side of said device, a second fluid operated device for operating the second valve, and means for admitting fluid at brake pipe and reservoir pressures respectively onto opposite sides of said second device.

2. A train brake control apparatus comprising a casing, a valve therein controlling an exhaust port, a pneumatic device therein for operating the said valve, a port in said casing for admitting fluid at brake pipe pressure to one side of said device, a second valve for controlling the admission of fluid at brake pipe pressure to the opposite side of said device, a second pneumatic device for operating the second valve, and means for admitting fluid at brake pipe and reservoir pressures respectively onto opposite sides of said second pneumatic device.

3. In a train control apparatus, in combination with the brake pipe of an air brake system, a valve for opening the brake pipe to exhaust to effect an application of the brakes, means operated by brake pipe pressure for opening said valve, and means for normally resisting the movement of said means by brake pipe pressure and operable for releasing the firstnamed means for movement by brake pipe pressure to open said valve, the last named means having an adjustable spring acting against brake pipe pressure for automatically closing said valve after a predetermined reduction of pressure in said brake pipe.

4. In a train control apparatus, in combination with the brake pipe of an air brake system, a valve for opening the brake pipe to exhaust to effect an application of the brakes, means operated by brake pipe pressure for opening said valve, air pressure means connected with the firstnamed means to resist the opening of said valve and including valve means adapted to be opened to reduce the pressure in the secondnamed means to permit said valve to open, and an adjustable spring acting against the firstnamed means for automatically closing said valve after a predetermined reduction of pressure in said brake pipe.

In testimony whereof I hereunto affix my signature.

DANIEL HERBERT SCHWEYER.